(12) United States Patent
Seynaeve et al.

(10) Patent No.: US 12,485,770 B2
(45) Date of Patent: Dec. 2, 2025

(54) VEHICLE SYSTEM AND TRACTION CONTROL METHOD FOR THE VEHICLE SYSTEM

(71) Applicant: Dana Belgium N.V., Flanders (BE)

(72) Inventors: Koen B. Seynaeve, Veldegem (BE); Christophe De Buyser, Veldegem (BE); Yelle Vandergucht, Bruges (BE)

(73) Assignee: DANA BELGIUM, Bruges (BE)

( * ) Notice: Subject to any disclaimer, the term of this patent is extended or adjusted under 35 U.S.C. 154(b) by 165 days.

(21) Appl. No.: 18/471,879

(22) Filed: Sep. 21, 2023

(65) Prior Publication Data

US 2024/0109429 A1   Apr. 4, 2024

Related U.S. Application Data

(60) Provisional application No. 63/377,691, filed on Sep. 29, 2022.

(51) Int. Cl.
*B60L 15/20* (2006.01)
*B60W 30/18* (2012.01)

(52) U.S. Cl.
CPC .......... *B60L 15/20* (2013.01); *B60L 2240/12* (2013.01); *B60L 2240/14* (2013.01); *B60L 2250/28* (2013.01); *B60L 2260/22* (2013.01); *B60L 2260/24* (2013.01)

(58) Field of Classification Search
CPC ...... B60L 3/106; B60L 15/20; B60L 2250/28; B60W 30/18172; B60W 40/105; B60W 2540/10
See application file for complete search history.

(56) References Cited

U.S. PATENT DOCUMENTS

| | | | |
|---|---|---|---|
| 7,853,389 B2 | 12/2010 | Luehrsen et al. | |
| 8,244,445 B2 | 8/2012 | Luehrsen et al. | |
| 8,706,374 B2 | 4/2014 | Takiguchi et al. | |
| 8,849,538 B2 | 9/2014 | Kato et al. | |
| 9,707,965 B2 | 7/2017 | Mair | |
| 10,047,854 B2 | 8/2018 | Kelly et al. | |
| 2003/0034188 A1* | 2/2003 | Gotou | B60W 20/40 903/917 |
| 2008/0228337 A1* | 9/2008 | Bauerle | F02D 11/107 701/31.6 |
| 2011/0195817 A1* | 8/2011 | Whitney | F02D 31/001 477/121 |
| 2012/0309558 A1* | 12/2012 | Nakano | A63B 53/10 473/323 |
| 2016/0009271 A1* | 1/2016 | Choi | B60K 6/48 180/65.265 |
| 2021/0245727 A1* | 8/2021 | Zhao | B60L 15/20 |
| 2023/0303061 A1* | 9/2023 | DeWalt | B60W 20/19 |

FOREIGN PATENT DOCUMENTS

| | | |
|---|---|---|
| CN | 108284771 A | 7/2018 |
| GB | 2572640 B | 9/2020 |

* cited by examiner

*Primary Examiner* — Tan Q Nguyen
(74) *Attorney, Agent, or Firm* — McCoy Russell LLP

(57) ABSTRACT

Traction control systems and methods are provided. In one example, a method for operating a driveline system includes selecting a vehicle standstill driveline output torque set point that maps to a pedal position and adjusting the vehicle standstill driveline output torque set point based on vehicle speed and accelerator pedal position. Adjusting the output torque includes ramping up the output torque set point when vehicle acceleration is less than a threshold value.

20 Claims, 4 Drawing Sheets

VEHICLE SYSTEM AND TRACTION CONTROL METHOD FOR THE VEHICLE SYSTEM

CROSS REFERENCE TO RELATED APPLICATION

The present application claims priority to U.S. Provisional Patent Application No. 63/377,691, entitled "VEHICLE SYSTEM AND TRACTION CONTROL METHOD FOR THE VEHICLE SYSTEM", and filed on Sep. 29, 2022. The entire contents of the above-listed application are hereby incorporated by reference for all purposes.

TECHNICAL FIELD

The present disclosure relates to a traction control strategy for a vehicle system.

BACKGROUND AND SUMMARY

Some vehicles gather ground speed information and make it available to various control units in the vehicle such as driveline control units (DCUs). However, in other vehicles ground speed information is not available to the control units. For the latter, wheel slip is not directly calculable due to the lack of ground speed information. The inventors have therefore recognized a desire to develop a control strategy that reduces the chance of wheel slip without ground speed data inputs while granting high driveline output torque during situations that demand the high torque.

To at least partially address the abovementioned problems, the inventors developed a method for operation of a vehicle system. The method includes, in one example, selecting a vehicle standstill driveline output torque set point in a torque map that maps to a pedal position and adjusting the vehicle standstill driveline output torque set point based on vehicle speed and accelerator pedal position. In this way, the chance of wheel slip is reduced without the direct calculation of wheel slip using ground speed sensor data, for example. Tractive performance of the system is consequently increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
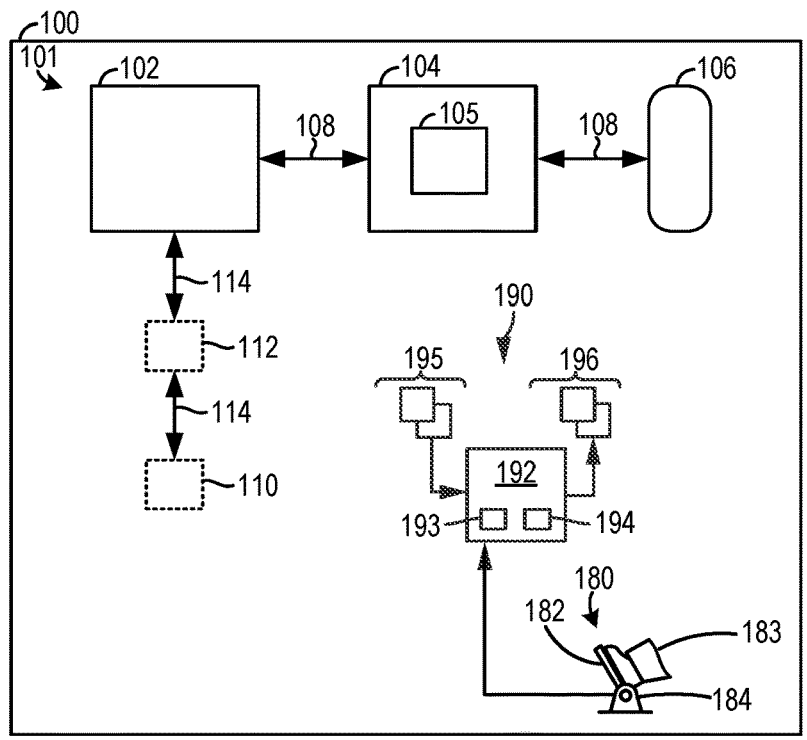
FIG. 1 is a schematic depiction of a vehicle system.

FIG. 1 depicts a vehicle 100 with a powertrain system 101 that may include a prime mover 102 (e.g., a traction motor or internal combustion engine), a driveline 104 that may include a transmission 105 (e.g., a gearbox such as a multi-speed gearbox), and drive wheels 106. The vehicle 100 may be an on or off highway vehicle. More generally, the vehicle 100 may be a light, medium, or heavy duty vehicle, for instance. The transmission 105 may include shafts, gears, and clutches in the case of a multi-speed transmission. In one example, the powertrain may be an electric powertrain (e.g., an all-electric drive unit). In such an example, the electric powertrain includes a traction motor, a traction battery and/or other suitable energy storage device, and a transmission. In one specific example, traction motors may be incorporated into wheel end gear reductions. In this example, the driveline, transmission, and traction motors form integrated units at each drive wheel. In other examples, the powertrain may be a hybrid powertrain or a powertrain which solely relies on an internal combustion engine for motive power.

Arrows 108 denote the mechanical power transfer that occurs between the prime mover, the driveline, and the drive wheels.

The driveline 104 may include one or more differentials and axle shafts (e.g., half shafts) that rotationally connect the differential to the drive wheels 106. Further, in such an example, the differential, axle shafts, and the drive wheels may be included in a drive axle assembly. To elaborate, the vehicle may include one or more drive axle assemblies.

The prime mover 102 generates motive power for vehicle propulsion. As such, the prime mover 102 may include an electric machine (e.g., an electric motor-generator) and/or an internal combustion engine. As such, the vehicle 100 may be an electric vehicle (EV) (e.g., a battery electric vehicle (BEV) or a hybrid electric vehicle (HEV)). The electric machine may include components such as a rotor and a stator that electromagnetically interact during operation to generate motive power. The electric machine may be electrically coupled to one or more energy storage device(s) (e.g., one or more traction batteries, capacitor(s), fuel cell(s), combinations thereof, and the like) by way of an inverter when the machine is designed as alternating current (AC) machine. However, a direct current (DC) electric machine may be used in alternate examples.

The electric machine may specifically be a traction motor, in one example. In such an example, the traction motor may be operated to apply positive torque to a driveline to induce vehicle acceleration. Conversely, the traction motor may be operated to receive torque from the driveline and generate electrical power and transfer the power to an energy storage device 110 (e.g., a traction battery) in a regenerative mode. Further, an inverter 112 may supply electrical power to the traction motor from the energy storage device 110. Arrows 114 denote the transfer of electrical energy between the prime mover 102 which is a traction motor in this example, the inverter 112, and the energy storage device 110.

The vehicle 100 further includes a control system 190 with a controller 192 (e.g., driveline control unit (DCU)) as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 192 may receive various signals from sensors 195 coupled to various regions of the vehicle 100 and the transmission 105. For example, the sensors 195 may include a pedal position sensor 184 designed to detect a depression of an operator-actuated pedal such as an accelerator pedal (e.g., a single pedal that controls both accelerator and braking discussed in greater detail herein), a speed sensor at the driveline output shaft, and the like. Motor speed may be ascertained from the amount of power sent from the inverter 112 to the electric machine. A ground speed sensor may be omitted from the vehicle 100, in one specific example. However, in other examples, the vehicle may include a ground speed sensor which makes ground speed information available to the controller. Further, in one example, the control system may include a brake pedal. However, in alternate examples, the brake pedal may be omitted from the control system.

An input device 180 (e.g., a pedal that dictates both acceleration and braking in the case of a single pedal driving embodiment or an accelerator pedal and a brake pedal in other embodiments, drive mode selector, combinations thereof, and the like) may further provide input signals indicative of an operator's intent for vehicle control. To elaborate, in the illustrated example, the input device 180 includes a pedal 182 (e.g., an accelerator pedal) that an operator 183 is able to depress and a pedal position sensor 184 for generating a proportional pedal position signal PP. The pedal position signal may correspond to pedal depression as a percentage of maximum pedal depression. The pedal 182 may be used for single pedal driving, as indicated above.

Upon receiving the signals from the various sensors 195 of FIG. 1, the controller 192 processes the received signals, and employs various actuators 196 of vehicle components to adjust the components based on the received signals and instructions stored on the memory of controller 192. For example, the controller 192 may receive a pedal signal indicative of an operator's request for increased vehicle acceleration. In response, the controller 192 may command operation of the prime mover (e.g., via the inverter 112) to adjust the prime mover and increase the power delivered from the prime mover to the driveline. The other controllable components in the vehicle may function in a similar manner with regard to sensor signals, control commands, and actuator adjustment, for example. Further, the control system 190 is designed to carry out the traction control methods expanded upon herein.

Further, in one example, the vehicle system may be configured to implement a single pedal driving strategy where one pedal is used to accelerate and decelerate the vehicle. In the EV example, the deceleration may correspond to a regeneration mode where the electric motor generates electrical energy. The torque response of the powertrain with regard to pedal input may be dynamically adjusted based on vehicle speed and/or vehicle acceleration. For instance, a torque set point at vehicle standstill (e.g., and at full accelerator pedal depression) may be ramped up and down based on vehicle speed and/or vehicle acceleration to increase the system's tractive performance. To elaborate, a conservative starting point with a minimum torque set point that does not ramp up may be selected if there is sufficient vehicle acceleration, in one example. Conversely, if the vehicle acceleration remains low, the torque set point is ramped up, in such an example. Consequently, customer appeal is increased.

FIGS. 2A-2D depict torque maps 200, 202, 204, and 206 with transmission output torque, vehicle speed, and pedal position on the different axes. The torque maps shown in FIGS. 2A-2D and the other torque maps described herein may be used to control a powertrain system such as the powertrain system 101 shown in FIG. 1. To elaborate, the transmission output torque may be a function of vehicle speed and pedal position. Pedal position may be expressed as a percentage of maximum pedal depression. In such an example, pp5 may correspond to a maximum pedal depression value.

Figure 2A:
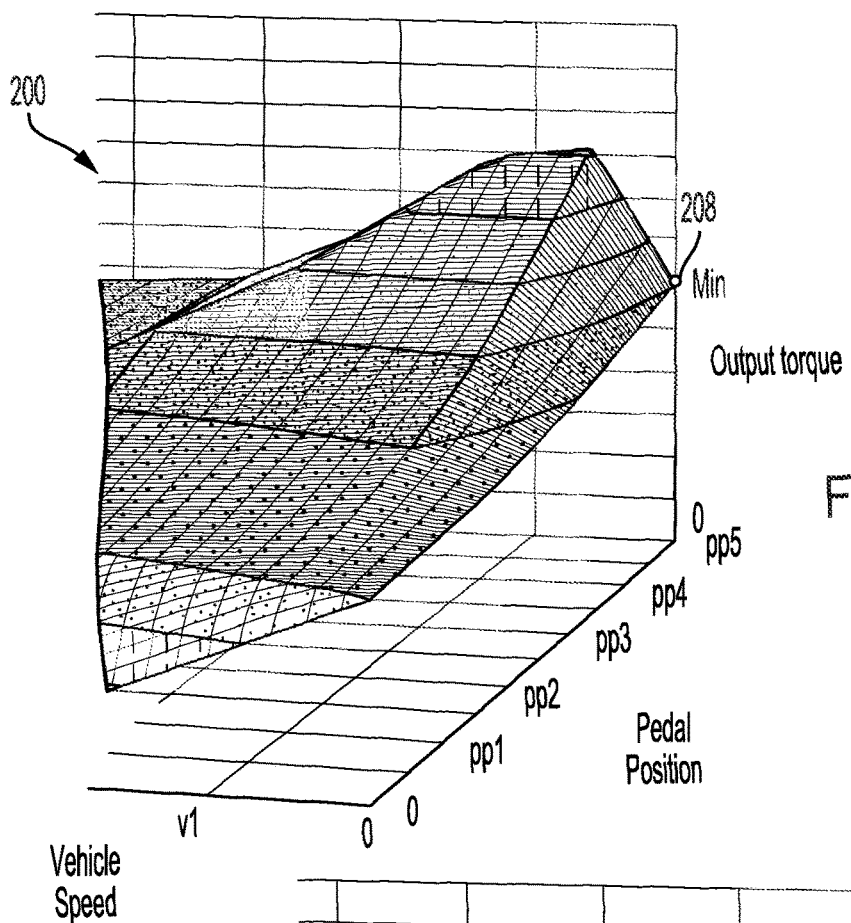
FIGS. 2A-2D illustrate different occurrences of flexible torque maps associated with a traction control strategy.

FIG. 2A specifically shows a predetermined vehicle standstill torque set point 208 that corresponds to the torque at the output of the driveline. To elaborate, the predetermined vehicle standstill torque set point may be a torque set point at zero vehicle speed and 100% or approaching 100% pedal depression (e.g., accelerator pedal depression, in one example).

Figure 2B:
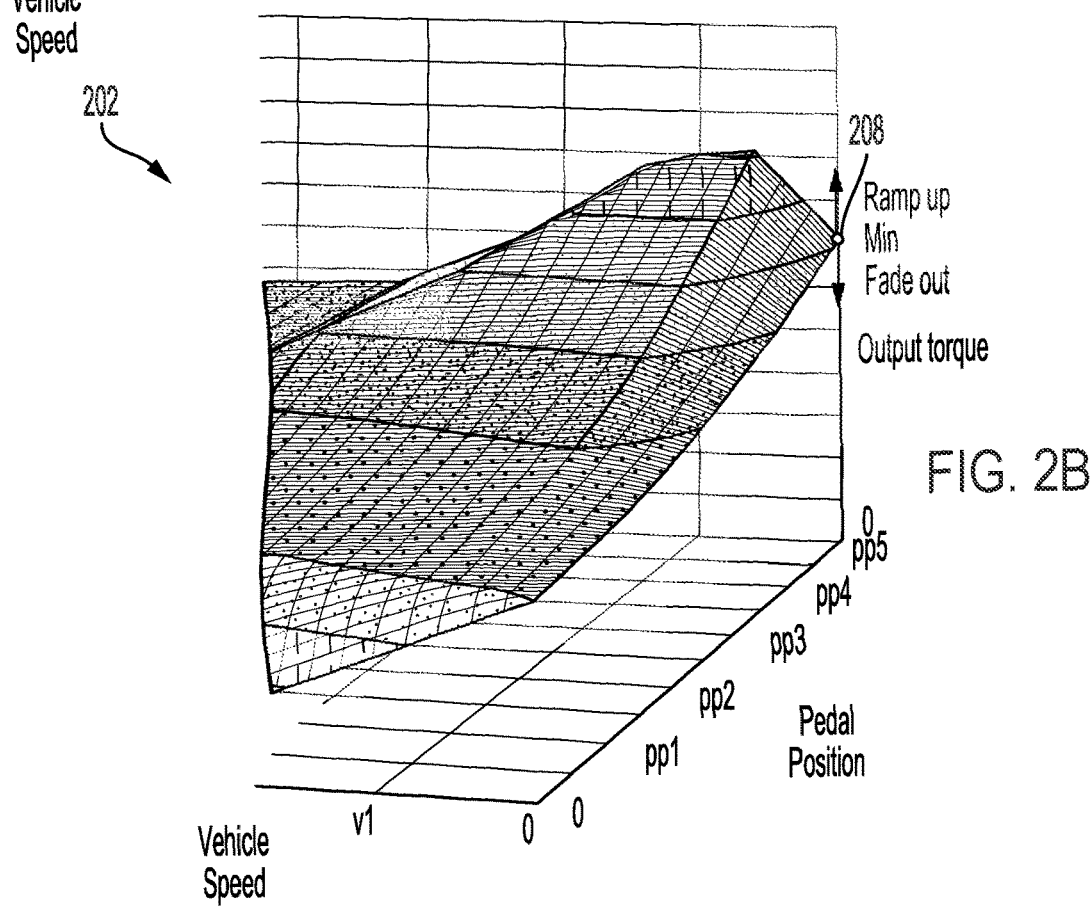
Figure 2C:
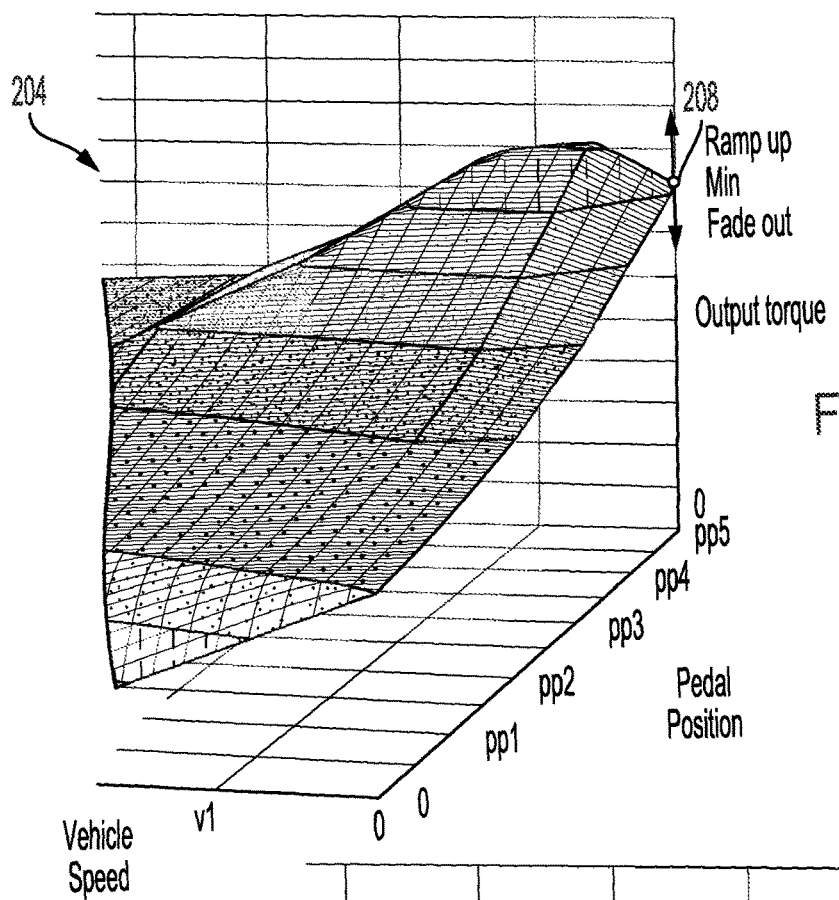
Figure 2D:
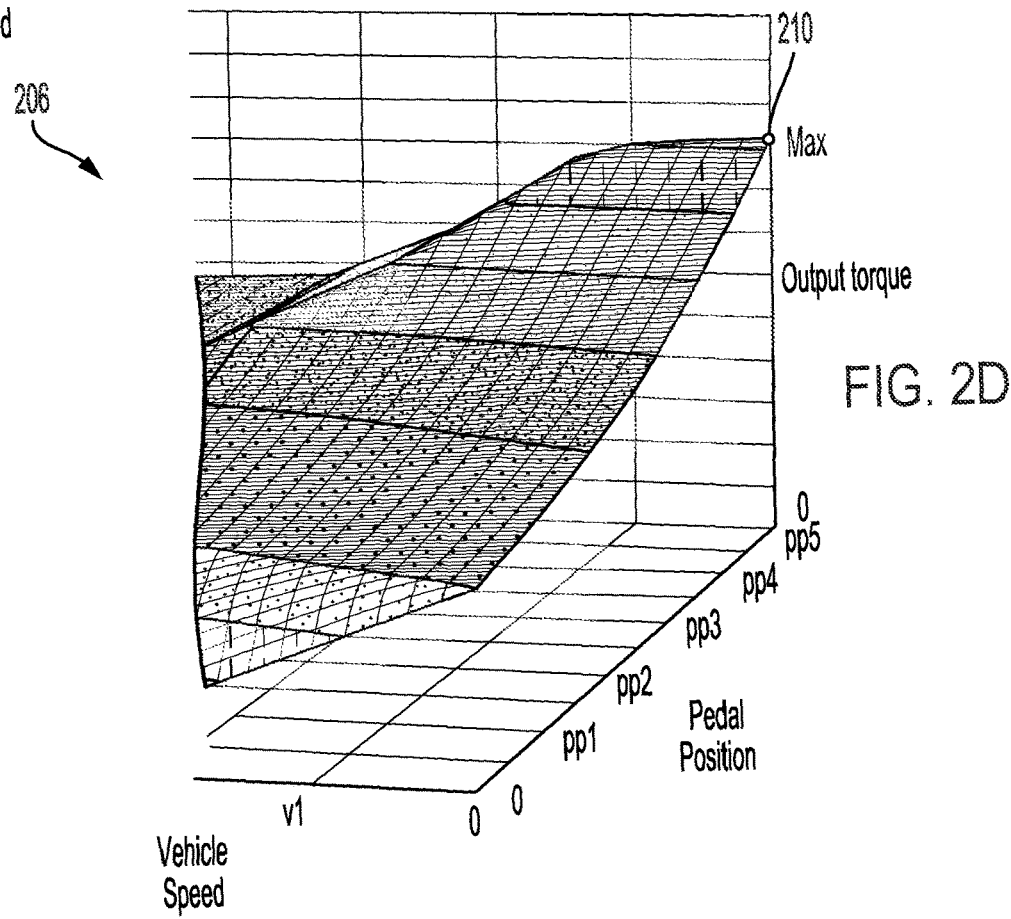

FIGS. 2B-2D show the vehicle standstill torque set point 208 being sequentially ramped up until it reaches a maximum value 210. This ramping up may occur when the pedal position is greater than a threshold value and the vehicle acceleration is less than a threshold value. These threshold values may be selected to enable the vehicle standstill torque set point value to be ramped up without a high chance of wheel slip. It will be appreciated that the output torque map may be first constructed, opening up the full torque necessitated for meeting application demands. Subsequently, the vehicle standstill torque set point may be tuned down so that no wheel slip occurs in most or in normal situations, if desired. It will be understood, that this tuning down may involve a tradeoff, since there may be another situation where wheel slip will occur. Subsequently, the prime mover and/or the transmission may be controlled based on the torque map.

Figure 3:
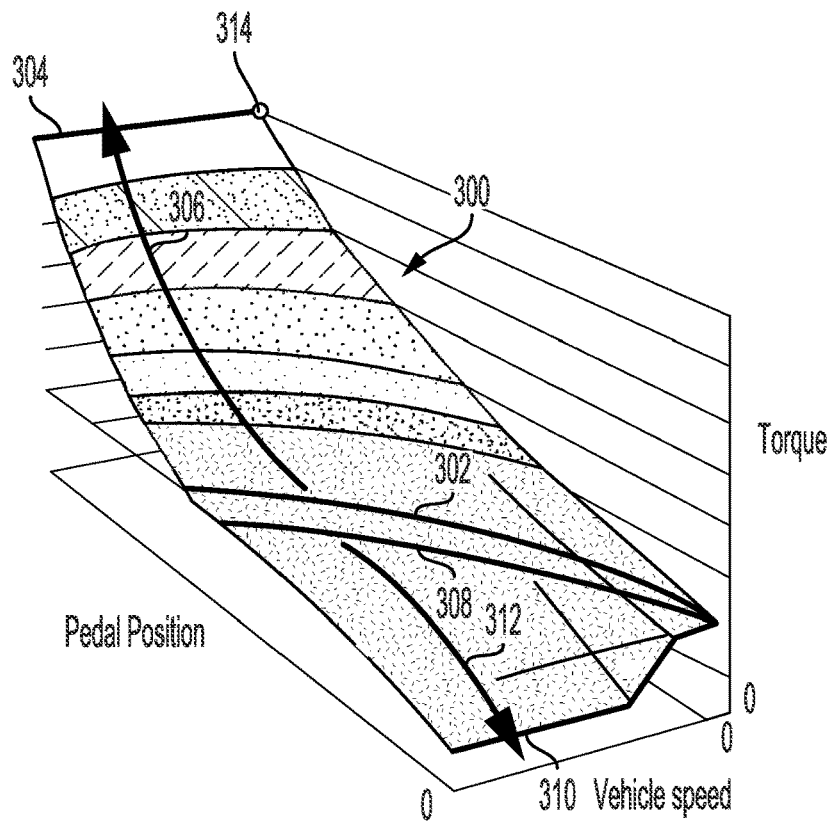
FIG. 3 illustrates another example of an occurrence of a flexible torque map for a traction control strategy.

FIG. 3 shows another example of a torque map 300 for a single pedal driving strategy with transmission output torque, vehicle speed, and pedal position on the different axes. Curves 302 and 304 bound the traction portion of the torque map. In the traction portion of the torque map, adjustment in pedal position alters the traction torque at the driveline output. Curve 306 defines how the traction torque progresses in the traction portion and of the torque map.

Conversely, curves 308 and 310 bound the regeneration portion of the torque map. Curve 312 dictates how the deceleration progresses during regeneration operation. During regeneration operation the traction motor is operated as a generator to generate electrical power and transfer the power to a traction battery.

A beginning point 314 of curve 304 may be ramped up and ramped down based on vehicle speed and acceleration. After this ramping, the torque curve may be reshaped. The torque set point ramping is expanded upon herein with regard to FIG. 4.

Figure 4:
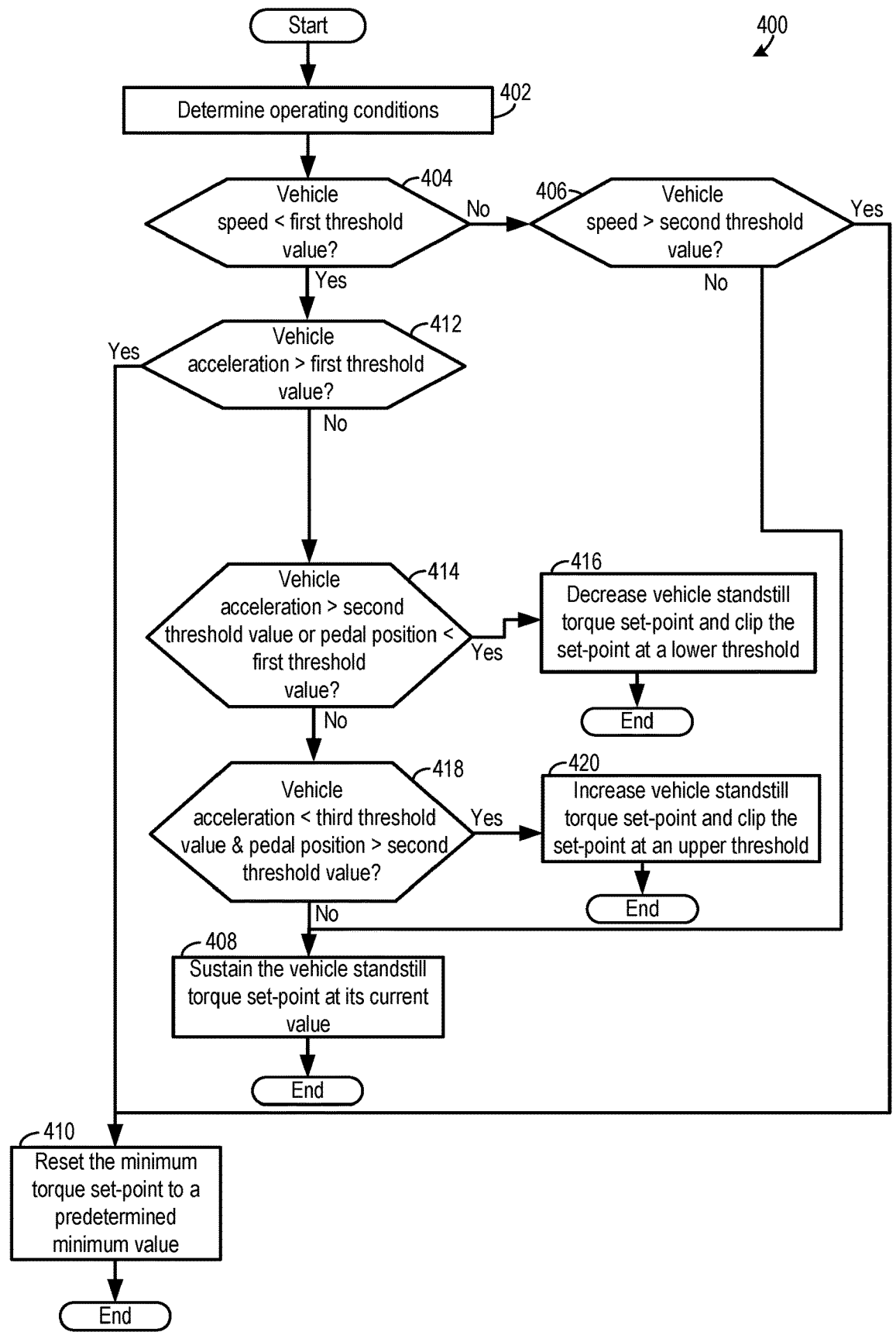
FIG. 4 is a method for operation of a vehicle system to reduce wheel slip.

FIG. 4 shows a method 400 for operation of a powertrain system. The method 400 may be carried out by any of the systems or combinations of the systems described herein with regard to FIGS. 1-3. The method 400 is related to a traction control strategy that reduces the chance of drive wheel slip while allowing the powertrain to provide a high amount of torque during certain operating conditions. However, the method 400 may be carried via other suitable systems, in other examples. Furthermore, the method 400 may be implemented as instructions stored in memory (e.g., non-transitory memory) of the controller that is executable by a processor.

At 402, the method includes determining operating conditions. The operating conditions may include prime mover speed (e.g., traction motor speed), driveline output speed, transmission output speed, wheel speed, vehicle speed, vehicle acceleration, and the like. The operating conditions may be ascertained via sensor inputs, modeling, look-up tables, and/or other suitable techniques.

Next at 404, the method includes judging if vehicle speed is less than a first threshold value. For instance, in one use-case example, the first threshold value may be 3 kilometers per hour (km/h). However, other suitable speed thresholds may be used in other examples.

If it is determined that the vehicle speed is not less than the first threshold value (NO at 404), the method moves to 406 where the method includes judging if the vehicle speed is greater than a second threshold value. The second speed threshold may be greater than the first speed threshold. For instance, the second speed threshold may be 6 km/h, in one use-case example.

If it is determined that the vehicle speed is greater than the second threshold value (YES at 406) the method moves to 410 where the method includes resetting the vehicle standstill driveline output torque set point (e.g., the vehicle standstill driveline output torque set point at full pedal depression (100% depression)) to a predetermined minimum value.

Conversely, if it is determined that the vehicle speed is not greater than the second threshold value (NO at 406) the method moves to 408 where the method includes sustaining a vehicle standstill driveline output torque set point (e.g., the vehicle standstill driveline output torque set point at full pedal depression (100% depression)).

If it is determined that the vehicle speed is less than the first threshold value (YES at 404), the method moves to 412. At 412, the method includes determining if the vehicle acceleration is greater than a first threshold value. If it is determined that the vehicle acceleration is greater than the first threshold value (YES at 412) the method proceeds to 410. Conversely, if it is determined that the vehicle acceleration is not greater than the first threshold value (NO at 412) the method moves to 414. At 414, the method includes determining if the vehicle acceleration is greater than a second threshold value or the pedal position is less than a first threshold value. If it is determined that the vehicle acceleration is greater than the second threshold value or the pedal position is less than the first threshold value (YES at 414), the method moves to 416 where the method includes decreasing the vehicle standstill driveline output torque set point (e.g., the vehicle standstill driveline output torque set point at full accelerator pedal depression (100% depression)) and clipping the output torque set point at a lower threshold (e.g., a minimum output torque set point). Clipping the output torque set point constrains the ramping down of the set point. In this way, the torque set point is ramped down.

If it is determined that the vehicle acceleration is not greater than the second threshold value or the pedal position is not less than the first threshold value (NO at 414) the method moves to 418.

At 418, the method includes judging of the vehicle acceleration is less than a third threshold value and the pedal position is greater than a second threshold value for a predetermined duration (e.g., 300 milliseconds (ms)).

If it is determined that the vehicle acceleration is less than the third threshold value and the pedal position is greater than the second threshold value (YES at 418) the method moves to 420 where the method includes increasing the vehicle standstill driveline output torque set point (e.g., the vehicle standstill driveline output torque set point at full accelerator pedal depression (100% depression)) and then clipping the output torque set point at an upper threshold (e.g., a maximum output torque set point). Clipping the output torque set point constrains the ramping up of the set point. In this way, the torque set point at vehicle standstill is ramped up.

Conversely, if it is determined the vehicle acceleration is not less than the third threshold value and/or the pedal position is not greater than the second threshold value (NO at 418) the method moves to 408. Method 400 allows the torque map to be ramped up and down to avoid wheel slip while providing a high torque in situations that demand such torque. Consequently, the powertrain's traction control performance is increased.

The technical effect of the traction control methods described herein is to enhance vehicle handling performance by decreasing the likelihood of wheel slip, particularly after launch while still granting full traction torque when vehicle conditions demand full traction torque (e.g., when there is insufficient acceleration due to heavy load and/or uphill grade, for instance).

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a method for operating a driveline system is provided that comprises selecting a vehicle standstill driveline output torque set point that maps to a pedal position; and adjusting the vehicle standstill driveline output torque set point based on vehicle speed and accelerator pedal position.

In any of the aspects or combinations of the aspects, adjusting the vehicle standstill driveline output torque set point may include ramping up the vehicle standstill driveline output torque set point when the pedal position is greater than a threshold value and the acceleration is less than a threshold value and clipping the vehicle standstill driveline output torque set point at a maximum value.

In any of the aspects or combinations of the aspects, adjusting the vehicle standstill driveline output torque set point may include ramping down the vehicle standstill driveline output torque set point when the accelerator pedal position is less than a threshold value and the acceleration is greater than a threshold value and clipping the vehicle standstill driveline output torque set point at a minimum value.

In any of the aspects or combinations of the aspects, the driveline system may be an electric drive.

In any of the aspects or combinations of the aspects, the drive system may not include a ground speed sensor.

In another aspect, a method for operating a powertrain system is provided that comprises selecting a vehicle standstill driveline output torque set point for the powertrain system that maps to a pedal position of an accelerator pedal; adjusting the vehicle standstill driveline output torque set point based on vehicle speed and accelerator pedal position; and controlling the powertrain system based on the adjusted vehicle standstill driveline output torque. In one example, adjusting the vehicle standstill driveline output torque set point may include ramping up the vehicle standstill driveline output torque set point when the pedal position is greater than a first threshold value and a vehicle acceleration is less than a second threshold value. Further in one example, adjusting the vehicle standstill driveline output torque set point may include ramping down the vehicle standstill driveline output torque set point when the accelerator pedal position is less than a third threshold value and the vehicle acceleration is greater than a fourth threshold value. In one example, the vehicle standstill driveline output torque may be included in a torque map that is a function of vehicle speed and the pedal position. Still further, in one example, the torque map may include a positive torque portion corresponding to vehicle traction, a zero torque portion corresponding to vehicle coasting, and a negative torque portion corresponding to a regeneration mode where a traction motor is generating electrical energy. Still further, in one example, the powertrain system may be an electric drive. In one example, the electric drive may be included in an all-electric vehicle. In one example, the powertrain system may not include a ground speed sensor. In one example, the pedal may be an accelerator pedal.

In another aspect, a vehicle system is provided that comprises a prime mover rotationally coupled to a driveline; a pedal sending a pedal position to a controller; wherein the controller includes instructions that when executed cause the controller to: select a vehicle standstill driveline output torque set point for the powertrain system that maps to a pedal position of an accelerator pedal; adjust the vehicle standstill driveline output torque set point based on vehicle speed and accelerator pedal position; and control the powertrain system based on the adjusted vehicle standstill driveline output torque. In one example, adjusting the vehicle standstill driveline output torque set point may include ramping up the vehicle standstill driveline output torque set point when the pedal position is greater than a first threshold value and a vehicle acceleration is less than a second threshold value. In one example, adjusting the vehicle standstill driveline output torque set point may include ramping down the vehicle standstill driveline output torque set point when the accelerator pedal position is less than a first threshold value and the vehicle acceleration is greater than a second threshold value. In one example, the prime mover may be a traction motor. Further, in one example, the vehicle system may be included in an all-electric vehicle. Further, in one example, the controller may be a driveline control unit (DCU). Still further, in one example, the vehicle system may not include a ground speed sensor.

In another aspect, a method for operating an electric vehicle (EV) powertrain system is provided that comprises ramping up or down a vehicle standstill driveline output torque set point for the powertrain system that maps to a pedal position of an accelerator pedal based on vehicle speed and accelerator pedal position; and controlling the powertrain system based on the vehicle standstill driveline output torque. In one example, the vehicle standstill driveline output torque may be included in a torque map that is a function of vehicle speed and the accelerator pedal position. Further, in one example, the torque map may include a positive torque portion corresponding to vehicle traction, a zero torque portion corresponding to vehicle coasting, and a negative torque portion corresponding to a regeneration mode where a traction motor is generating electrical energy. Still further in one example, the EV may not include a ground speed sensor.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the electric drive unit and/or vehicle system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a powertrain system, comprising:
selecting a driveline output torque set point at a vehicle standstill condition for the powertrain system that maps to a pedal position of an accelerator pedal;
adjusting the driveline output torque set point at the vehicle standstill condition based on vehicle speed and a position of an accelerator pedal; and
controlling the powertrain system based on the adjusted standstill driveline output torque;
wherein the vehicle standstill condition is a condition that occurs at zero vehicle speed and the accelerator pedal is at or approach 100% depression; and
wherein the accelerator pedal is a single pedal that controls both acceleration and braking.

2. The method of claim 1, wherein adjusting the driveline output torque set point at the vehicle standstill condition includes:
ramping up the driveline output torque set point when the pedal position is greater than a first threshold value and a vehicle acceleration is less than a second threshold value; and
clipping the driveline output torque set point at a maximum value.

3. The method of claim 2, wherein adjusting the driveline output torque set point includes:
ramping down the driveline output torque set point when the accelerator pedal position is less than a third threshold value and the vehicle acceleration is greater than a fourth threshold value; and
clipping the driveline output torque set point at a minimum value.

4. The method of claim 1, wherein the driveline output torque set point is included in a torque map that is a function of vehicle speed and the pedal position.

5. The method of claim 4, wherein the torque map includes a positive torque portion corresponding to vehicle traction, a zero torque portion corresponding to vehicle coasting, and a negative torque portion corresponding to a regeneration mode where a traction motor is generating electrical energy.

6. The method of claim 1, wherein the powertrain system is an electric drive included in an all-electric vehicle.

7. The method of claim 6, wherein the pedal position is full pedal depression.

8. The method of claim 1, wherein the powertrain system does not include a ground speed sensor.

9. The method of claim 1, wherein the pedal is an accelerator pedal.

10. A vehicle system, comprising:
a prime mover rotationally coupled to a driveline;
a pedal sending a pedal position to a controller;
wherein the controller includes instructions that when executed cause the controller to:
select a driveline output torque set point at a vehicle standstill condition for the vehicle system that maps to the pedal position of the pedal;
adjust the driveline output torque set point at the vehicle standstill condition based on vehicle speed and a position of an accelerator pedal; and
control the vehicle system based on the adjusted driveline output torque set point;
wherein the vehicle standstill condition is a condition that occurs at zero vehicle speed and the accelerator pedal is at or approach 100% depression; and
wherein the accelerator pedal is a single pedal that controls both acceleration and braking.

11. The vehicle system of claim 10, wherein adjusting the driveline output torque set point includes:
ramping up the driveline output torque set point when the pedal position is greater than a first threshold value and a vehicle acceleration is less than a second threshold value; and
clipping the driveline output torque set point at a maximum value.

12. The vehicle system of claim 10, wherein adjusting the driveline output torque set point includes:
ramping down the driveline output torque set point when the accelerator pedal position is less than a first threshold value and the vehicle acceleration is greater than a second threshold value; and
clipping the driveline output torque set point at a minimum value.

13. The vehicle system of claim 10, wherein the prime mover is a traction motor.

14. The vehicle system of claim 10, wherein the vehicle system is included in an all-electric vehicle.

15. The vehicle system of claim 10, wherein the controller is a driveline control unit (DCU).

16. The vehicle system of claim 10, wherein the vehicle system does not include a ground speed sensor.

17. A method for operating an electric vehicle (EV) powertrain system, comprising:
ramping up or down a driveline output torque set point at a vehicle standstill condition for the powertrain system that maps to a pedal position of an accelerator pedal based on vehicle speed and a position of an accelerator pedal; and
controlling the powertrain system based on the driveline output torque at the vehicle standstill condition;
wherein the vehicle standstill condition is a condition that occurs at zero vehicle speed and the accelerator pedal is at or approach 100% depression; and
wherein the accelerator pedal is a single pedal that controls both acceleration and braking.

18. The method of claim 17, wherein the driveline output torque set point at the vehicle standstill condition is included in a torque map that is a function of vehicle speed and the accelerator pedal position.

19. The method of claim 18, wherein the torque map includes a positive torque portion corresponding to vehicle traction, a zero torque portion corresponding to vehicle coasting, and a negative torque portion corresponding to a regeneration mode where a traction motor is generating electrical energy.

20. The method of claim 17, wherein the EV does not include a ground speed sensor.

* * * * *